United States Patent [19]

Abè et al.

[11] Patent Number: 4,561,026
[45] Date of Patent: Dec. 24, 1985

[54] REPRODUCING APPARATUS FOR REPRODUCING RECORDED SIGNALS FROM A ROTARY RECORDING MEDIUM

[75] Inventors: Ryozo Abè; Masaki Sakurai, both of Yokohama, Japan

[73] Assignee: Victor Company of Japan, Ltd., Yokohama, Japan

[21] Appl. No.: 569,585

[22] Filed: Jan. 10, 1984

[30] Foreign Application Priority Data

Jan. 14, 1983 [JP] Japan .............................. 58-3601[U]

[51] Int. Cl.[4] ......................... H04N 5/76; G11B 21/10
[52] U.S. Cl. ................................... 358/336; 358/342; 358/907; 369/50
[58] Field of Search ............... 358/342, 343, 336, 907; 360/19.1, 10.1, 10.2, 11.1, 27; 369/44, 48, 50, 59, 43

[56] References Cited

U.S. PATENT DOCUMENTS

| | | | |
|---|---|---|---|
| 4,142,209 | 2/1979 | Hedlund et al. | 369/44 |
| 4,308,557 | 12/1981 | Dieterich | 369/59 |
| 4,428,003 | 1/1984 | Sugiyama et al. | 358/342 |
| 4,432,021 | 2/1984 | Kaneko | 358/342 |
| 4,488,278 | 12/1984 | Dieterich | 369/50 |
| 4,490,752 | 12/1984 | Machida et al. | 358/342 |
| 4,499,505 | 2/1985 | Sugiyama et al. | 358/342 |

*Primary Examiner*—Donald McElheny, Jr.

*Attorney, Agent, or Firm*—Louis Bernat

[57] ABSTRACT

A reproducing apparatus comprises a reproducing circuit including a pickup reproducing element, for reproducing recorded signals from a rotary recording medium, an address signal reproducing circuit for reproducing a track shift address signal from the signals which are reproduced by the reproducing circuit, a detecting circuit for detecting whether the address signal is reproduced with a predetermined period, a memory for storing the value of the reproduced address signal or a flag which is related to the value of the reproduced address signal, when the detecting circuit detects that the address singal is reproduced with the predetermined period, and a circuit for generating a control signal which causes the pickup reproducing element to undergo a forced track shift at predetermined positions on the tracks so that the pickup reproducing element scans along a scanning locus which has the same periodicity as the scanning locus along which the pickup reproducing element had been scanning up to that point. The control signal is generated based on the value of the reproduced address signal when the detecting circuit detects that the address signal is reproduced with the predetermined period, and based on one or a plurality of values which are pre-stored in the memory when the detecting circuit detects that the address signal is not reproduced with the predetermined period.

4 Claims, 23 Drawing Figures

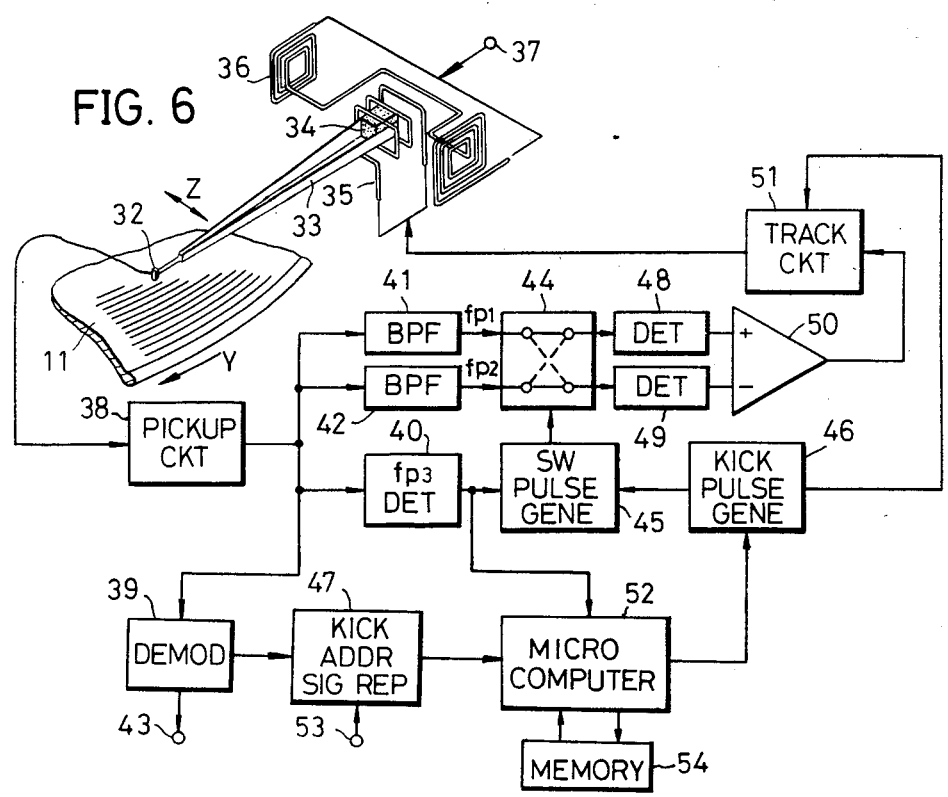

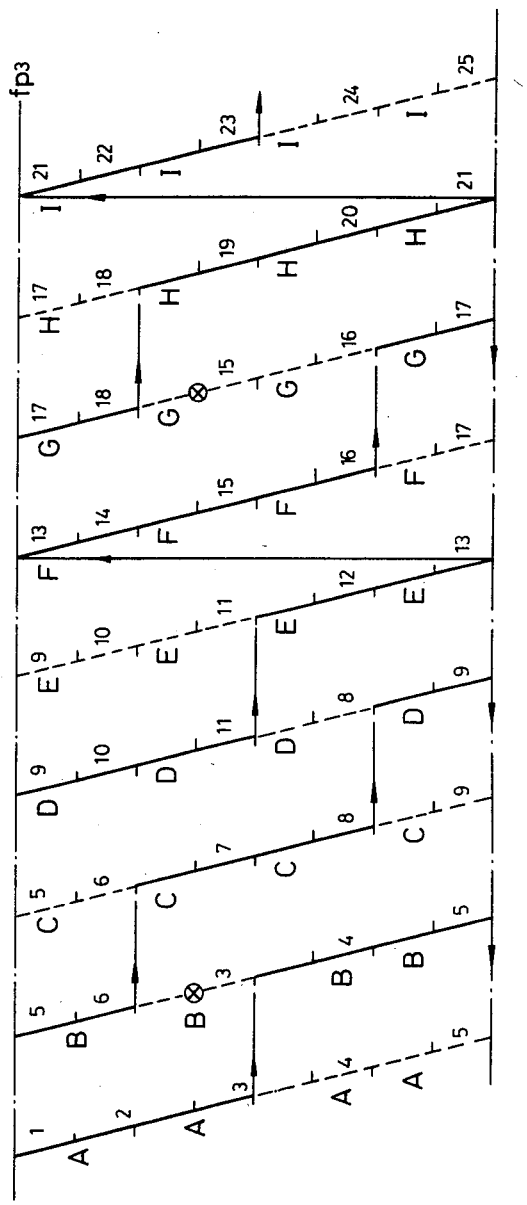

REPRODUCING APPARATUS FOR REPRODUCING RECORDED SIGNALS FROM A ROTARY RECORDING MEDIUM

BACKGROUND OF THE INVENTION

The present invention generally relates to reproducing apparatuses for reproducing recorded signals from a rotary recording medium, and more particularly to a reproducing apparatus which can selectively and satisfactorily carry out a still-picture reproduction and a normal reproduction, and also accurately carry out a normal reproduction even when there is a signal dropout in the signal which is reproduced from the rotary recording medium during the normal reproduction.

An information signal recording and reproducing system has been previously proposed in which the recording system forms pits in accordance with the information signal to record the information signal along a spiral track on a flat rotary recording medium (hereinafter simply referred to as a disc), without forming a groove therein. In the reproducing system, a reproducing stylus scans over this track to reproduce the recorded information signal in response to variations in the electrostatic capacitance formed between the reproducing stylus and the disc.

In this previously proposed system, since no grooves are provided on the disc for guiding the reproducing stylus, it becomes necessary to record, on the disc, pilot or reference signals on or in the vicinity of a track of the information signal such as a video signal. Upon reproduction, the reference signals are reproduced together with the video signal. Tracking control is carried out so that the reproducing stylus accurately scans over the track in response to the reproduced reference signals.

By use of this previously proposed system, there is no possibility whatsoever of the reproducing stylus or the disc being damaged, since the recording track has no groove. The reproducing stylus can repeatedly scan over the same portion of the track many times, whereby it becomes possible to carry out a special reproduction such as still-picture reproduction, slow-motion reproduction, or quick-motion reproduction.

In the above type of a disc, a standard is set for the above proposed system so that four fields of the video signal are recorded for one track turn of the disc. This standard was set in order to increase the recording capacity under the restrictions which are introduced due to the practical diameter and rotational speed of the disc, the relative linear speed between the reproducing stylus and the disc for obtaining a satisfactory signal-to-noise (S/N) ratio, and the like.

When a still-picture reproduction is carried out with the above disc, the same track turn is reproduced repeatedly. Accordingly, the four fields of the video signal are repeatedly reproduced in this case, to carry out the still-picture reproduction. However, if the picture content of the video signal which is to be reproduced is a moving picture, the picture which is recorded in one track turn becomes different in each of the four fields. As a result, the picture obtained by the above still-picture reproduction is not completely still, and the picture appears to undergo a reciprocating movement. Hence, as the movement in the above moving picture becomes faster, the reciprocating movement in the reproduced still picture increases in magnitude. Therefore, there is a disadvantage in that the reproduced still picture does not appear still, and is unpleasant to watch.

On the other hand, another system may be considered wherein the same video information content is repeatedly recorded in four fields in one track turn, and the still-picture reproduction is carried out by repeatedly reproducing the same one track turn. In this case, even if the same one track turn is repeatedly reproduced, the reproduced still picture is completely still, because only the same video information content is repeatedly reproduced from the four fields which make up the above one track turn.

If the above disc is repeatedly recorded with the video information of the first field throughout the four fields in the first track turn, repeatedly recorded with the video information of the fifth field throughout the four fields in the succeeding track turn, and thereafter similarly and repeatedly recorded with the same video information throughout the four fields in one track turn, the reproduced still picture is completely still. However, because $\frac{3}{4}$ of the video information is missing, there is a disadvantage in that the movement in the reproduced picture is not smooth and continuous upon normal reproduction.

On the other hand, the disc may be repeatedly recorded with the video information of the first field throughout the four fields in the first track turn, repeatedly recorded with the video information of the second field throughout the four fields in the succeeding track turn, and thereafter similarly and repeatedly recorded with video information of each field throughout the four fields in one track turn without missing any video information. When playing such a disc, a completely still reproduced picture can be obtained. However, upon normal reproduction, the video information in each field is reproduced four times, and the reproduced picture becomes a slow-motion reproduction picture. Moreover, in discs capable of providing completely still reproduced picture, there is a disadvantage in that an audio signal cannot be reproduced in a normal manner.

In order to overcome the above described problems, a disc and reproducing apparatus therefor was proposed in a U.S. patent application Ser. No. 363,795, Pat. No. 4,490,752, filed March 31, 1982 entitled "ROTARY RECORDING MEDIUM AND REPRODUCING APPARATUS THEREFOR" in which the assignee is the same as the assignee of the present application. In this proposed disc and reproducing apparatus, the disc is repeatedly recorded with a video signal of the same unit for a plurality of field periods in each track turn, and divided audio signal parts which are obtained by dividing an audio signal in units of field periods of the video signal which is to be reproduced are successively arranged and recorded on a recording track of the video signal according to a scanning locus of a reproducing element on the disc upon normal reproduction during which change of track is performed by forcibly shifting the reproducing element at least once or a plurality of times for two revolution periods of the disc. Thus, the disc reproducing apparatus can obtain a completely still reproduced picture by repeatedly reproducing the video signal of the same unit in one track turn upon still-picture reproduction. Upon normal reproduction, a satisfactory normal reproduction picture and a normally reproduced audio signal can be obtained, by forcibly shifting the reproducing element to another track at predetermined positions on the disc.

However, during the normal reproduction, the reproducing element may be forcibly shifted to another track at position other than the original intended shifting position. In such a case, the normal reproduction picture and the normally reproduced audio signal which are obtained, are unsatisfactory. Furthermore, the video signal which is recorded on one recording surface of the disc, is usually not from the same kind of a video signal source. That is, a video signal from one kind of a video signal source is often mixed into the video signal from another video signal source. For example, when recording an educational program, the picture corresponding to a scene in which a teacher and the like comments, is obtained from a video signal which is reproduced from a magnetic recording and reproducing apparatus. On the other hand, the picture corresponding to a scene in which the teacher's comments are finished and the contents are described concretely, is obtained from a video signal from a movie film, for example.

In this case, the recording method for the video signal which is reproduced under the normal reproduction, differs according to the video signal source. Hence, it becomes necessary to change the scanning locus of the reproducing element according to the kind of the video signal source. However, it is difficult to cause the reproducing element to scan over a predetermined scanning locus upon normal reproduction in accordance with the video signal source, without specific information thereof.

The disc may be recorded with a video information on one recording surface, where the video information is time-sequentially multiplexed with two different video information. One video information may be a video information which is to be reproduced with a picture arbitrarily selected from a still picture and a normal reproduction picture, and the other video information may be a video information which is to be reproduced only as a normal reproduction picture. For example, in a program containing a golf tournament, the picture corresponding to the scene in which the player makes a shot is a video information which can either be obtained as a still picture or a normal reproduction picture, and this scene is selectively reproduced as a still picture or a normal reproduction picture. On the other hand, the picture corresponding to a scene in which the player walks to his golf ball need not be reproduced as a still picture, and thus, this scene is a video information which is to be obtained only as a normal reproduction picture. When playing such a disc, it is highly desirable to obtain a normal reproduction picture in which the movements are natural. This may be realized if the reproducing apparatus can automatically discriminate the tracks which are recorded with the video information which is to be obtained as either one of the selected still picture and the normal reproduction picture, and the tracks which are recorded with the video information which is to be obtained only as the normal reproduction picture.

In addition, in the case of the slow-motion reproduction, the video information which is recorded on one track turn is repeatedly reproduced for a number of times in accordance with the slow-motion reproduction ratio, the video information which is recorded on one succeeding track turn is repeatedly reproduced for the same number of times, and these reproducing operations are successively performed. Hence, the same disadvantages which are introduced in the case of the still-picture reproduction described before, are introduced during the slow-motion reproduction. Further, in the conventional disc and the above proposed disc, the video information (sports program and science experiment program, for example) which is to be reproduced in slow-motion, is recorded throughout a plurality of track turns by a normal recording. Accordingly, the recording method is uneconomical because there is a limit to the recording area of the disc.

Moreover, in a case where the video information which is to be reproduced by the normal reproduction and/or the video information which is to be reproduced by the still-picture reproduction, and the video information which is to be reproduced by the slow-motion reproduction, are respectively time-sequentially recorded on the same recording surface of the disc, it will be useful if the reproducing apparatus can automatically discriminate the reproduction mode of the video information which is recorded on the track which is being reproduced.

In order to eliminate the various problems described heretofore, a rotary recording medium and a reproducing apparatus therefor were proposed in a U.S. patent application Ser. No. 433,872 filed October 13, 1982 entitled "ROTARY RECORDING MEDIUM AND REPRODUCING APPARATUS THEREFOR" in which the assignee is the same as the assignee of the present application.

According to this proposed disc, the disc comprises a video signal of the same unit repeatedly recorded for N-field period (N is a natural number greater than or equal to 2) for each track turn, a track shift address signal for instructing the existence of forced track shift of a pickup reproducing element, the shifting direction, and the shifting position, recorded on at least one position for one revolution of the disc with a constant period regardless of the kind of video signal source of the video signal, where the track shift address signal comprises at least a synchronizing code, disc type discriminating code, a kick existence instructing code, and a kick direction instructing code, and divided audio signal parts which are obtained by dividing an audio signal for every field period of the video signal which is reproduced. The divided audio signal parts are successively arranged and recorded according to a scanning locus of the pickup reproducing element upon normal reproduction. The disc has track parts which are recorded with the divided audio signal parts on at least one part of a recording surface thereof.

According to the above disc, a completely still reproduced picture, normal reproduction picture, and normally reproduced audio signal can be obtained selectively. In addition, it is possible to obtain a slow-motion reproduction picture of a slow-motion reproduction ratio which is specified by the creator. Moreover, the scanning locus of the pickup reproducing element when obtaining a normal reproduction picture or a slow-motion reproduction picture by forcibly shifting the pickup reproducing element to another track, is uniquely determined. Thus, a normal reproduction picture and normally reproduced audio signal can be obtained accurately, even from a disc in which the still picture recording tracks are scattered on the same recording surface thereof.

However, according to the above reproducing apparatus, the track shift address signal is discriminated during the normal reproduction so as to forcibly shift the pickup reproducing element. Thus, when the track shift address signal is not reproduced due to signal dropout and the like, the pickup reproducing element will not be shifted at predetermined positions on the disc. In this case, because the audio signal is recorded in accordance with the scanning locus of the pickup reproducing element during the normal reproduction, there is a problem in that the reproduced audio signal will be discontinuous. In addition, the movements in the normal reproduction picture will be unnatural in this case, since the pickup reproducing element is not shifted at the predetermined positions on the disc.

SUMMARY OF THE INVENTION

Accordingly, it is a general object of the present invention to provide a novel and useful reproducing apparatus, in which the above described problems have been eliminated.

Another and more specific object of the present invention is to provide a reproducing apparatus which reproduces recorded signals from a rotary recording medium which is repeatedly recorded with a video signal of the same unit for a plurality of fields for each track turn and is also recorded with a track shift address signal which instructs the existence of a forced track shift of a pickup reproducing element, the shifting direction, and the shifting position, where the track shift address signal is recorded on at least one position in one track turn with a constant period. The reproducing apparatus according to the present invention comprises detecting means for detecting whether the track shift address signal within the signal which is reproduced by the pickup reproducing element is reproduced with a constant period during a reproduction in which the pickup reproducing element is caused to scan according to the instructions contained in the track shift address signal, memory means for storing the value of the track shift address signal or a flag related to the track shift address signal when the track shift address signal is reproduced with a constant period, and control signal generating means for generating a control signal for forcibly shifting the pickup reproducing element at predetermined positions based on the value of the track shift address signal when the detecting means detects that the track shift address signal is reproduced with a constant period or based on one or a plurality of values stored in the memory means when the detecting means detects that the track shift address signal is not reproduced with a constant period. The reproducing apparatus according to the present invention is designed so that the pickup reproducing element scans in the same periodical manner as the scanning locus which is formed during the previous scan performed by the pickup reproducing element. According to the reproducing apparatus of the present invention, a normal reproduction picture and a normally reproduced audio signal can be obtained accurately by avoiding discontinuities in the audio signal, even when the track shift address signal is not reproduced due to causes such as signal dropout.

Still another object of the present invention is to provide a reproducing apparatus which is designed so that a flag which indicates whether the forced track shift is to be carried out in a reverse direction immediately prior to the reproduction of the track shift address signal, is renewed and stored into the above memory means every time the track shift address signal is reproduced. The memory means pre-stores two kinds of data which are in accordance with the existence and non-existence of a forced track shift of the pickup reproducing element in the reverse direction. When the track shift address signal is not reproduced, one of the two kinds of data which are pre-stored in the memory means is read out based on the value of the flag which is stored in the memory means, and the control signal generating means generates a control signal based on the value of the read-out data. According to the reproducing apparatus of the present invention, the circuit construction may be simplified, and further, the computer program may be simplified.

Other objects and further features of the present invention will be apparent from the following detailed description when read in conjunction with the accompanying drawings

BRIEF DESCRIPTION OF THE DRAWINGS

FIGS. 5(A) through 5(H) respectively shows other examples of values of each code in the track shift address signal shown in FIG. 3 in hexadecimal numbers;

FIG. 6 is a systematic block diagram showing an embodiment of a reproducing apparatus according to the present invention;

FIG. 11 is a flowchart showing a first embodiment of the operation of the microcomputer in the block system shown in FIG. 6;

FIG. 12 is a flowchart showing a second embodiment of the operation of the microcomputer in the block system shown in FIG. 6;

FIG. 14 shows the reproducing sequence of pictures of a movie film and the reproducing sequence of divided audio signal parts when carrying out a normal reproduction according to the scanning locus shown in FIG. 8.

DETAILED DESCRIPTION

Figure 1:
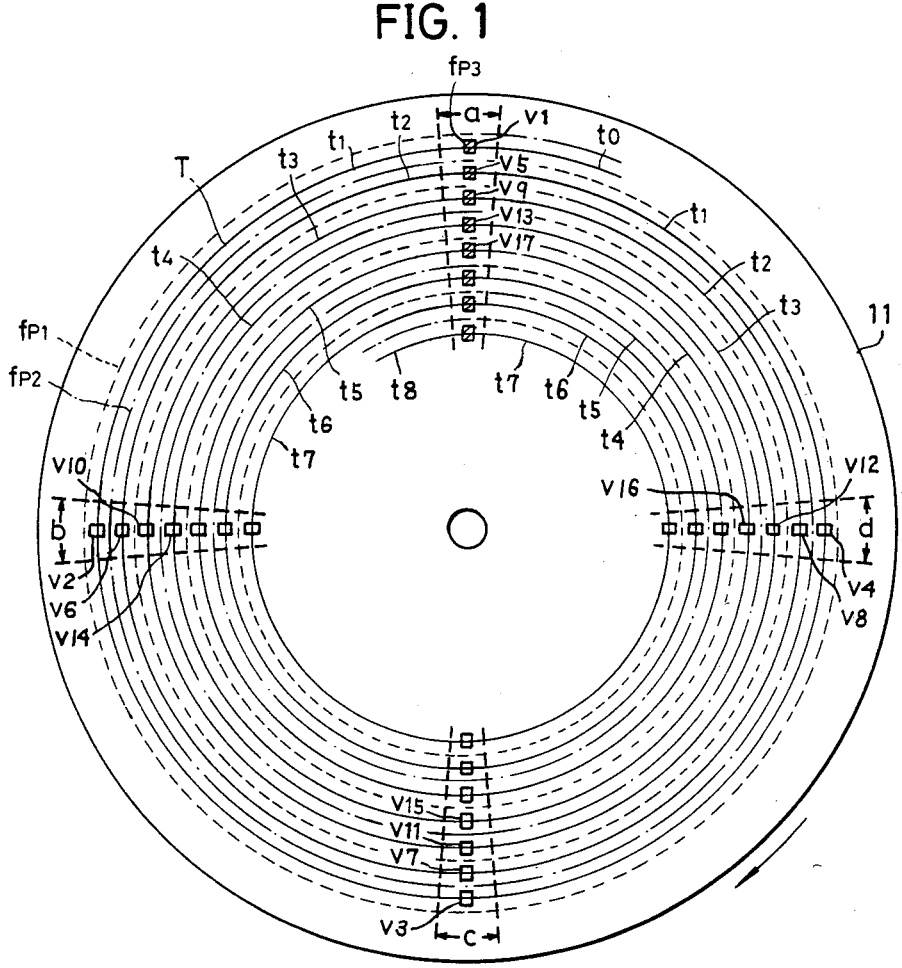
FIG. 1 generally shows a track pattern on a rotary recording medium.

FIG. 1 generally shows a track pattern on a rotary recording medium (hereinafter simply referred to as a disc) 11. A main information signal comprising a video signal and an audio signal, is recorded on a spiral track T as a frequency-modulated signal, with pits formed on the disc 11 according to the information contents of the signal. Track turns of a single continuous spiral track T, corresponding to each revolution of the disc 11, are designated by t1, t2, t3, ... . Each track turn is constituted by the formation of pits of the main information signal along a plane track path and has no stylus guide groove formed therein. With respect to one track turn t1, in every horizontal scanning period (1H) at a position corresponding to the horizontal blanking period, pits of a first reference signal fp1 are formed on one lateral side of the track as viewed in the track path direction. Pits of a second reference signal fp2 are formed on the other side of the track.

At an intermediate position between the centerlines of adjacent track turns, only pits of either one kind of the pits of the above reference signals fp1 and fp2 are formed, and moreover, with respect to one track, the sides on which the reference signals fp1 and fp2 are recorded are alternated for every track turn. That is, in FIG. 1, the tracks of the reference signal fp1 are shown by dotted lines, and the tracks of the reference signal fp2 are shown by one-dot chain lines. Reference characters V1 V2, V3, ... indicate the positions of the vertical synchronizing signal in each field. In addition, a third reference signal fp3 is recorded at the starting end positions V1, V5, V9, ... of each of the track turns t1, t2, t3, ..., that is, at positions where the reference signals fp1 and fp2 change over, for a duration of 3H, for example.

One revolution period of the disc 11 is equal to a period of four fields of the video signal. The vertical blanking periods are recorded on the tracks t1, t2, t3, ... within sections indicated by a, b, c, and d in FIG. 1. Various address signals which will be described later on in the specification, are also recorded within the vertical blanking period.

Among the four sections a through d in each of the tracks t1, t2, t3, ..., where the vertical blanking periods are recorded, a chapter address signal $A_C$ and a time address signal $A_T$ are time-sequentially recorded within the three sections b, c, and d as indicated by rectangular marks in FIG. 1. In addition, a track shift address signal $A_K$ is recorded instead of the address signals $A_C$ and $A_T$, within the section a as indicated by rectangular marks with hatchings in FIG. 1. In other words, the track shift address signal $A_K$ is recorded within the section a where the vertical blanking periods are recorded, and the track shift address signal $A_K$ occurs with one revolution period of the disc 11.

Figure 2:
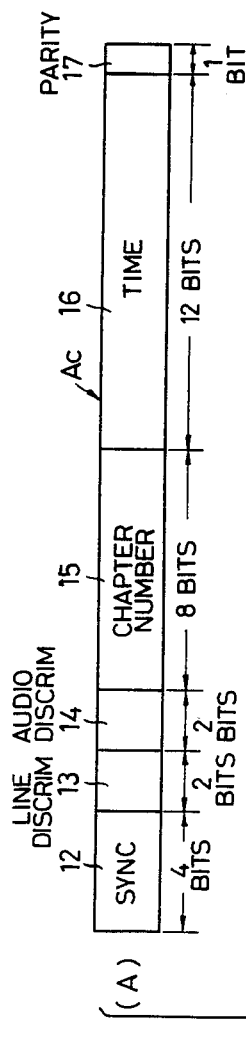
FIGS. 2(A) and 2(B) respectively show the constitution of a chapter address signal and a time address signal.

FIG. 2(A) diagrammatically shows the constitution of the 29-bit chapter address signal $A_C$ which indicates the sequence of the recorded programs on the same recording surface of the disc. The chapter address signal $A_C$ comprises a 4-bit synchronizing code 12 which is indicated by SYNC, a 2-bit line discriminating code 13, a 2-bit audio discriminating code 14, an 8-bit chapter number discriminating code 15, a 12-bit time discriminating code 16, and a 1-bit parity bit 17. In a case where the recorded video signal is of the NTSC system, the chapter address signal $A_C$ is multiplexed with each horizontal scanning period of horizontal scanning line numbers "17" and "280" (that is, with respect to both the odd and even fields, the chapter address signal $A_C$ is multiplexed with one horizontal scanning period from the eighth incoming horizontal synchronizing signal after the equalizing pulse which follows the vertical synchronizing pulse) and transmitted.

The synchronizing code 12 is "1100" in binary number, which is "C" in hexadecimal number. The line discriminating code 13 is a code for discriminating the transmission line of the chapter address signal $A_C$. The audio discriminating code 14 is a code for indicating the kind of the recorded audio signal (stereo, monaural, bilingual, and the like, for example). Moreover, the chapter number discriminating code 15 is a code for indicating the sequence of the recorded program, and can indicate a chapter number of up to "99" at the maximum, for example. The time discriminating code 16 is a code for indicating the track position from each starting position of the recorded program at each chapter number which is indicated by the chapter number discriminating code 15, in terms of seconds in time. The time discriminating code 16 is also called the local address, and can indicate up to 4095 ($=2^{12}-1$) seconds at the maximum from zero second.

On the other hand, FIG. 2(B) diagrammatically shows the constitution of the 29-bit time address signal $A_T$, which indicates the track position from the starting position of the first recorded program within the program recorded section on the disc, in terms of time. The time address signal $A_T$ comprises a 4-bit synchronizing code 18, a 2-bit line discriminating code 19, a 2-bit audio discriminating code 20, a 16-bit time discriminating code 21, a 4-bit track discriminating code 22, and a 1-bit parity bit 23. The above time address signal $A_T$ is transmitted within one horizontal scanning period which follows the transmission period of the chapter address signal $A_C$ (at horizontal scanning line numbers "18" and "281"). The line discriminating code 19 indicates the above transmission period of the time address signal $A_T$. The contents of the synchronizing code 18 and the audio discriminating code 20 are respectively the same as the contents of the synchronizing code 12 and the audio discriminating code 13. In addition, the time discriminating code 21 indicates the normal reproduction time of all the recorded programs from the first recorded position, and can indicate up to "59" minutes and "59" seconds at the maximum from zero minute and zero second.

The track discriminating code 22 is a code for discriminating the track number of tracks which are reproduced within one second. In a disc from which a video signal having a field frequency of 60 Hz is to be reproduced together with the audio signal, for example, the reproduction is carried out in a state where the disc is rotated fifteen times per second. Thus, it becomes necessary to discriminate which track among the fifteen tracks being reproduced within the same one second, is being reproduced, and this is the reason why the above track discriminating code 22 is provided. However, in the disc employed in the present invention, because the normal reproduction is carried out by shifting the track one or a plurality of times during one revolution of the disc, the manner in which the tracks are numbered is distinctive, as will be described later on in the specification. For example, in the case of a disc with which the normal reproduction is carried out with respect to every second track, the track discriminating code 22 assumes a value between "0" and "14" for every thirty tracks if the rotational speed of the disc is 900 rpm. If the rotational speed of the disc is 750 rpm, the track discriminating code 22 assumes a value between "0" and "11" for twenty-four tracks, and assumes a value between "0" and "12" in the following twenty-six tracks.

The track shift address signal (hereinafter simply referred to as a kick address signal) $A_K$ has a constitution shown in FIG. 3. In the case where the video signal is of the NTSC system, for example, a first kick address signal is transmitted within one horizontal scanning period at the horizontal scanning line number "17", within the vertical blanking period in which the third reference signal fp3 is transmitted. A second kick address signal is transmitted within one horizontal scanning period at the horizontal scanning line number "18". However, the contents of the codes only differ slightly for the first and second kick address signals because the kick address signal $A_K$ has the common signal format shown in FIG. 3.

Figure 3:
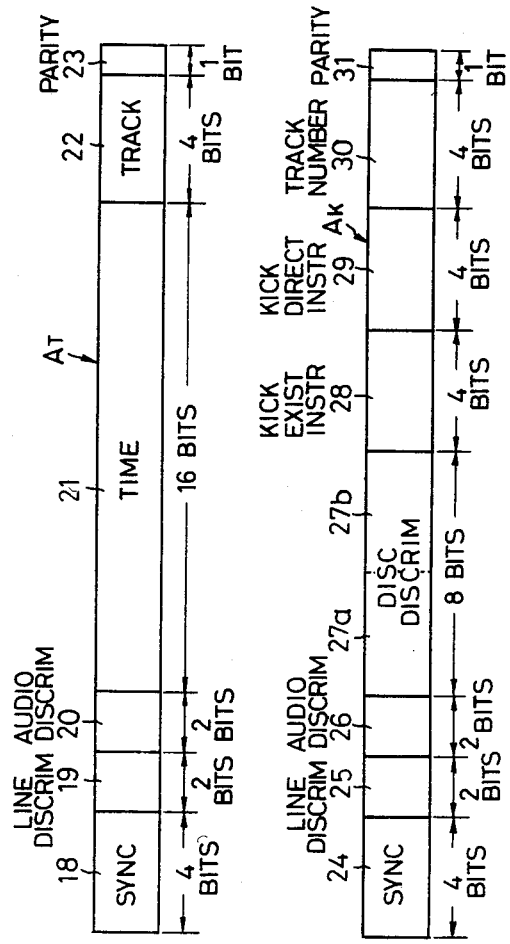
FIG. 3 shows an embodiment of a constitution of a track shift address signal which is employed in the present invention.

In FIG. 3, the 29-bit kick address signal $A_K$ comprises a 4-bit synchronizing code 24, a 2-bit line discriminating code 25, a 2-bit audio discriminating code 26, an 8-bit disc discriminating code consisting of an upper 4-bit code 27a and a lower 4-bit code 27b, a 4-bit kick existence instructing code 28, a 4-bit kick direction instructing code 29, a 4-bit track number code 30, and a 1-bit parity bit 31. The synchronizing code 24 assumes the same value as the synchronizing codes 12 and 18 of the above address signals $A_C$ and $A_T$ ("C" in hexadecimal number). In addition, the disc discriminating codes 27a and 27b respectively assume a value "A" in hexadecimal number.

The kick existence instructing code 28 is a code for instructing whether a forced track shift (hereinafter referred to as a kick) of the reproducing element by one track pitch, for example, is to be performed within the vertical blanking period. When the bit of this kick existence instructing code 28 is "1", it indicates that there is a kick, and "0" indicates that there is no kick. In addition, each of the four bits from the most significant bit (MSB) to the least significant bit (LSB) indicate the existence of a kick in the sections b, c, d, and a where the vertical blanking periods are recorded, in this sequence.

The kick direction instructing code 29 instructs the kicking direction. Each of the four bits from the the most significant bit (MSB) to the least significant bit (LSB) indicate the kicking direction in the sections b, c, d, and a, in this sequence. When the bit of this kick direction instructing code 29 is "1", it indicates that the kicking direction is the forward direction (towards the inner periphery of the disc), and "0" indicates that the kicking direction is in the reverse direction (outer periphery of the disc). The bit of the kick direction instructing code 29 assumes the value "0" when the corresponding bit in the kick existence instructing code 28 is "0". Further, the track number code 30 assumes a value from "0" to "3" in hexadecimal number, according to the kicking state.

Figure 4:
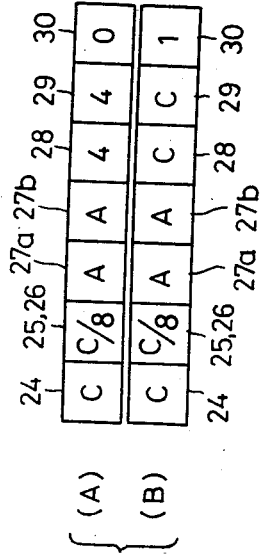
FIGS. 4(A) and 4(B) respectively show examples of values of each code in the track shift address signal shown in FIG. 3 in hexadecimal numbers.

The values of the kick existence instructing code 28, the kick direction instructing code 29, and the track number code 30, differ according to the signal source of the video signal which is recorded on the disc 11, the field frequency, and the like. This is because, when the video signal of the same unit is recorded on one track so as to obtain a completely still reproduced picture, the scanning locus of the reproducing element must different in order to obtain a normal reproduction picture including no time base fluctuations, as will be described later on in the specification. For example, in the case of a disc from which a video signal from a movie film having 24 or 30 pictures per second is to be reproduced as a video signal having a field frequency of 50 Hz or 60 Hz, the value of the kick address signal $A_K$ is selected as shown in FIGS. 4(A) and 4(B). On the other hand, in the case of a disc from which a video signal from a movie film having 24 pictures per second is to be reproduced as a video signal having a field frequency of 60 Hz, the value of the kick address signal $A_K$ is selected to the value of one of the eight kinds of kick address signals $A_{K1}$ through $A_{K8}$ shown in FIGS. 5(A) through 5(H). In FIGS. 4(A), 4(B), and 5(A) through 5(H), the hexadecimal value of the four bits which are made up from the codes 25 and 26, indicates that between the kick address signals which are time-sequentially recorded in a specific period of 2H within the section a on the same track turn, the value of the kick address signal which is recorded in the first period of 1H is "C" and that the value of the kick address signal which is recorded in the following period of 1H is "8".

Next, brief description will be given with respect to the video signal and the audio signal which are recorded on the disc 11. A video signal from a movie film having 24 or 30 pictures per second, is recorded in one track which starts from the section a so that the video signal of the same picture is repeatedly recorded four times (the video signal of one picture is recorded for ¼ revolution of the disc). Further, in the case of a video signal from a video signal source such as a video tape recorder, which has a field frequency of 50 Hz or 60 Hz, the video signal of the same field is repeatedly recorded for four fields. Moreover, the video signal from the movie film and from the video signal source such as the video tape recorder, is successively recorded from the outer periphery to the inner periphery of the disc, without loss of the picture information.

On the other hand, the audio signal is divided for every ½ field or one field. Each of the divided audio signals are arranged and recorded on the disc, in accordance with the scanning locus of the reproducing element at the time of normal reproduction.

Next, description will be given with respect to a reproducing apparatus which reproduces the recorded signals from the disc described heretofore. In FIG. 6, the disc 11 is placed onto a turntable (not shown) and periodically rotated at a high speed in the direction of an arrow Y together with the turntable, by a motor (not shown). The rotational speed of the disc 11 is selected to 750 rpm in the case where the disc is recorded with a color video signal from a movie film having 24 or 30 pictures per second, and the recorded video signal is to be reproduced with a field frequency of 50 Hz. On the other hand, the rotational speed of the disc 11 is selected to 900 rpm in the case where the disc is recorded with a color video signal from a movie film having 30 pictures per second, and the recorded video signal is to be reproduced with a field frequency of 60 Hz. As the disc 11 is rotated, a reproducing stylus 32 slides and scans over the surface of the disc 11.

The reproducing stylus 32 is fixed to an end of a cantilever 33, and a permanent magnet 34 is fixed to the base at the other end of the cantilever 33. The part where the permanent magnet 34 of the cantilever 33 is fixed, is surrounded by a jitter compensating coil 36 and a tracking coil 35 fixed to the reproducing apparatus. In the jitter compensating coil 36, right and left coil parts are respectively wound with the same phase. Accordingly, an attractive force or a repulsive force simultaneously acts on the permanent magnet 34 from these coil parts, according to the polarity of a jitter compensation signal which is obtained through an input terminal 37. As a result, the cantilever 33 moves linearly along the tangential direction of the track on the disc 11, and the jitter which is introduced due to eccentricity and surface irregularity or inconsistency of the disc 11 is compensated. In addition, the tracking coil 35 generates a magnetic field along a direction perpendicular to the magnetic field of the permanent magnet 34, and causes the cantilever 33 to move in one direction between directions of an arrow Z (track width direction) according to the polarity of a tracking error signal which is obtained from a tracking circuit 51, by a moving quantity which is in accordance with the magnitude of the tracking error signal.

A pickup circuit 38 comprises a resonant circuit which is varied of the resonance frequency according to the variation in the electrostatic capacitance between an electrode of the reproducing stylus 32 and the disc 11 due to the intermittent rows of pits, a circuit for applying a constant frequency signal to the resonant circuit, a circuit for detecting the amplitude of the high-frequency signal which is obtained from the resonant circuit, and a circuit for preamplifying the above detected high-frequency signal (reproduced signal). The high-frequency reproduced signal obtained from the pickup circuit 38 is supplied to a demodulator 39 wherein the main information signal (the video signal and the audio signal in this case) of the main track is demodulated. The demodulated signal is produced through an output terminal 43. On the other hand, a part of the high-frequency reproduced signal from the pickup circuit 38 is supplied to bandpass amplifiers 41 and 42, and a detector 40. The bandpass amplifiers 41 and 42 respectively have characteristics to frequency-select and amplify only the respective frequencies of the reference signals fp1 and fp2. The reference signals fp1 and fp2 which are respectively obtained from the bandpass amplifiers 41 and 42, are supplied to first and second input terminals of a gate switching circuit 44. The detector 40 frequency-selects the reference signal fp3 and generates an envelope detection signal. The detector 40 self-generates a detection signal which is in phase with the envelope detection signal of the reference signal fp3 which was obtained up to that point, even when the reference signal fp3 is not reproduced due to signal dropout and the like, and this detection signal is supplied to a switching pulse generator 45.

The gate switching circuit 44 is switched by a switching signal from the switching pulse generator 45. For example, during the high-level period of the switching signal, the respective output signals of the bandpass amplifiers 41 and 42 are independently applied to respective input terminals of detectors 48 and 49. On the other hand, during the low-level period of the switching signal, the respective output signals of the bandpass amplifiers 41 and 42 are independently applied to respective input terminals of the detectors 49 and 48.

The polarity of the switching signal from the switching pulse generator 45 is reversed with an incoming detection signal from the detector 40 or a kick pulse (excluding an incoming kick pulse during reproduction of the reference signal fp3) from a kick pulse generator 46 which will be described later on in the specification. An envelope detection signal of a reference signal which is reproduced from a track on the outer side of the track which is to be reproduced, is thus obtained from the detector 48. Moreover, an envelope detection signal of a reference signal which is reproduced from a track on the inner side of the track which is to be reproduced, is obtained from the detector 49. These output envelope detection signals of the detectors 48 and 49 are respectively supplied to a differential amplifier 50 provided in a subsequent stage of the system. A tracking error signal having a polarity which is in accordance with the direction of the tracking error and having a level (magnitude) which is in accordance with the tracking error quantity, is obtained from the differential amplifier 50. This tracking error signal is supplied to the tracking coil 35 through the tracking circuit 51 wherein the tracking error signal is converted into a predetermined driving voltage, to control the tracking coil 35. Accordingly, the reproducing stylus 32 is moved in the radial direction of the disc 11 with appropriate direction and quantity so that the tracking error becomes zero, and the reproducing stylus 32 accurately scans over the spiral track T on the disc 11. Further although its illustration is omitted in FIG. 6, a pickup device which includes the reproducing stylus 32, is fed in the radial direction of the disc 11 by a motor (not shown).

The main information signal which is demodulated in the demodulator 39, is supplied to a known color video signal reproducing system (not shown) and to a known audio signal reproducing system (not shown), through the output terminal 43. The demodulated main information signal is converted in these systems into a reproduced color video signal of a standard television system and a reproduced audio signal. The reproduced color video signal and the reproduced audio signal are then supplied to a monitoring television receiver (not shown).

In the reproducing apparatus according to the present invention, a kick control system comprising a kick address signal reproducing circuit 47 and the like, is additionally provided to control the kick of the reproducing stylus 32. That is, in the block system shown in FIG. 6, the demodulated main information signal from the demodulator 39 is produced through the output terminal 43 and is also supplied to the kick address signal reproducing circuit 47. For example, the kick address signal reproducing circuit 47 comprises a 28-bit shift register which is serially applied with the reproduced signal, a logic circuit for detecting that the values of the parallel outputs in the first through fourth bits of the shift register respectively are "C", the values of the parallel outputs in the fifth through eighth bits of the shift register respectively are "C" or "8", and the values of the parallel outputs in the ninth through sixteenth bits of the shift register respectively are "AA", a latch circuit for latching the values of the parallel outputs in the seventeenth through twenty-eighth bits of the shift register by a detection signal from the logic circuit, and a parallel-to-serial converter for subjecting the output of the latch circuit to a parallel-to-serial conversion and for supplying the converted signal to a microcomputer 52. The microcomputer 52 discriminates the existence of the kick and the direction of the kick based on the values of the codes 28 and 29. When it is discriminated that there does exist a kick, the microcomputer 52 produces a detection signal having a polarity which is in accordance with the direction of the kick.

A signal for making the kick address signal reproducing circuit 47 operative, is applied to an input terminal 53 only when a reproduction mode which is selected by the operator is the normal reproduction mode. When the operator selects a reproduction mode other than the normal reproduction mode, a signal for making the kick address signal reproducing circuit 47 inoperative is applied to the input terminal 53. However, during the still-picture reproduction mode, the microcomputer 52 generates a control signal which causes the kick pulse generator 46 to generate a kick pulse for every one revolution of the disc 11, based on the signal which is obtained from the input terminal 53 through the kick address signal reproducing circuit 47 and the like. In addition, during the normal reproduction mode, a control signal which causes the reproducing stylus 32 to scan over a desired scanning locus, is formed by the cooperation of the microcomputer 52 and a memory 54, and this control signal is supplied to the kick pulse generator 46 from the microcomputer 52.

Next, description will be given with respect to the operation of the reproducing apparatus according to the present invention during the normal reproduction mode. During the normal reproduction mode, the reproducing apparatus discriminates and reproduces the kick address signal, and the reproduced kick address signal is supplied to the microcomputer 52. If the disc 11 is recorded with the video signal from the movie film having 24 pictures per second and the recorded video signal is to be reproduced with the field frequency of 50 Hz, or if the disc 11 is recorded with the video signal from the movie film having 30 pictures per second and the recorded video signal is to be reproduced with the field frequency of 60 Hz, the kick address signal $A_K$ which is reproduced from the section a which is recorded with the vertical blanking period and occurs once for each revolution of the disc as shown in FIG. 1, normally contains the values shown in FIG. 4(A) so that the tracks which are identified by these values are successively reproduced. As shown in FIG. 4(A), the value of the kick existence instructing code 28 is "4" in hexadecimal number which is "0100" is binary number. Because only the second bit from the MSB is "1" in this case, the kick is carried out only within the section c. In addition, since the value of the kick direction instructing code 29 is also "4" in hexadecimal number as shown in FIG. 4(A), the direction of the kick within the section c is in the forward direction (towards the inner periphery of the disc). Accordingly, when a normal reproduction picture is to be obtained from the above disc, the reproducing stylus 32 is controlled to move over a scanning locus which scans over every second track.

When the disc is recorded with the video signal from the movie film having 24 pictures per second and the recorded video signal is to be reproduced with the field frequency of 60 Hz, the kick address signals $A_{K1}$ through $A_{K8}$ shown in FIGS. 5(A) through 5(H) are successively recorded within the section a, in a cyclic manner with a period of eight tracks. In other words, the kick address signal $A_{K1}$ is recorded on one track, the kick address signal $A_{K2}$ is recorded on a subsequent one track, the kick address signal $A_{K3}$ is recorded on a further subsequent track, etc., with a period of eight tracks.

In FIGS. 5(A) through 5(H), the synchronizing code 24 in each of the kick address signals $A_{K1}$ through $A_{K8}$ all assume the value "C", and this value is set to the same value as the synchronizing codes 12 and 18 of the address signals $A_C$ and $A_T$. Further, the value of the four bits which are made up from the line discriminating code 25 and the audio discriminating code 26, are set to the value "C" for those which are recorded within one horizontal scanning period of the horizontal scanning line number "17" and set to the value "8" for those which are recorded within one horizontal scanning period of the horizontal scanning line number "18".

Next, description will be given with respect to the values of the kick existence instructing code 28 and the kick direction instructing code 29, and the contents of the instructions. First, in the kick address signal $A_{K1}$, the kick existence instructing code 28 assumes the value "5" in hexadecimal number, and the kick direction instructing code 29 assumes the value "4" in hexadecimal number, as shown in FIG. 5(A). The above value "5" of the kick existence instructing code 28 in hexadecimal number, is "0101" in binary number, and the second bit from the MSB and the fourth bit (LSB) from the MSB respectively are "1". Accordingly, in this case, there is a kick in both the sections c and a. Moreover, the value "4" of the kick direction instructing code 29 in hexadecimal number, is "0100" in binary number. Thus, the kick is in the forward direction in the section c and in the reverse direction in the section a. Further, in the kick address signal $A_{K2}$ which is recorded on the track which is subsequent to the track which is recorded with the above kick address signal $A_{K1}$, the kick existence instructing code 28 assumes the value "B" and the kick direction instructing code 29 assumes the value "A". Hence, there is a kick in the forward direction in the sections b and d, and a kick in the reverse direction in the section a.

As clearly understood from the above description by analogy, the kick address signal $A_{K3}$ shown in FIG. 5(C) and the kick address signal $A_{K6}$ shown in FIG. 5(F) respectively indicate that there is a kick in the forward direction in the section d and a kick in the reverse direction in the section a. The kick address signal $A_{K4}$ shown in FIG. 5(D) indicates that there is a kick in the forward direction in the section c. The kick address signals $A_{K5}$ and $A_{K8}$ respectively shown in FIGS. 5(E) and 5(H) indicate that there is no kick throughout the entire one revolution of the disc. Furthermore, the kick address signal $A_{K7}$ shown in FIG. 5(G) indicates that there is a kick in the forward direction in the section b.

Figure 8:
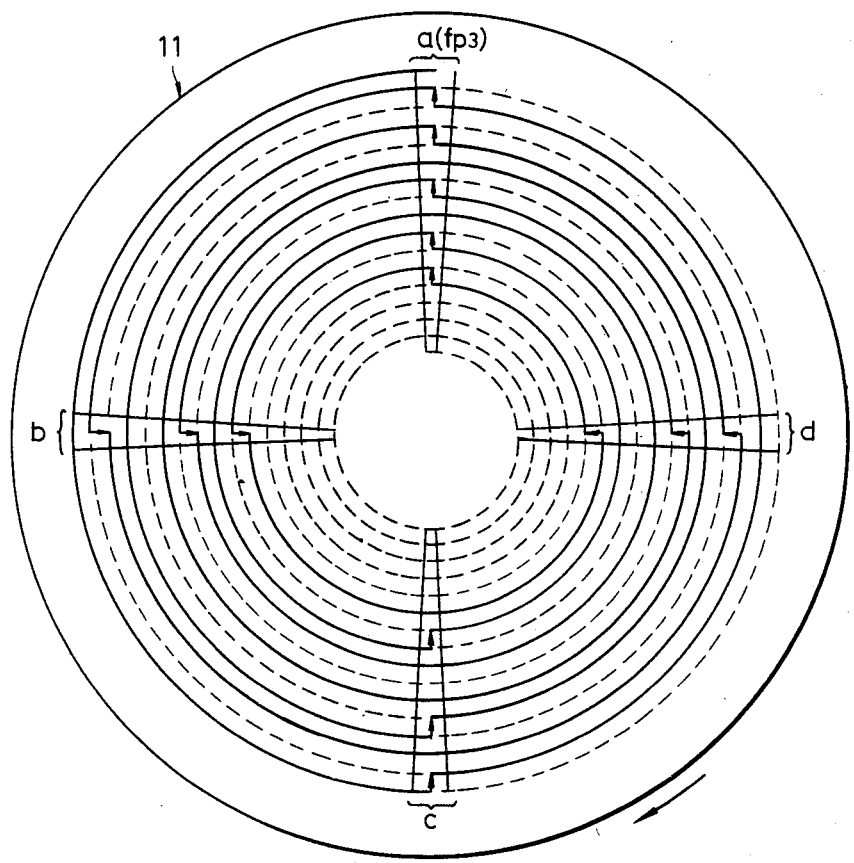
FIG. 8 shows another example of a scanning locus of a pickup reproducing element during a normal reproduction.

Because the values of the codes 28 and 29 in the kick address signals $A_{K1}$ through $A_{K8}$ are selected as described heretofore, the reproducing stylus 32 is forcibly kicked so as to move over a scanning locus which is indicated by a solid line in FIG. 8, during the normal reproduction mode in which the reproduction is carried out based on the values of the kick address signals $A_{K1}$ through $A_{K8}$. The kick address signal $A_K$ is recorded at a certain location in the section a so that the kick address signal $A_K$ will be reproduced after the reproducing stylus 32 is kicked within the section a.

Figure 7:
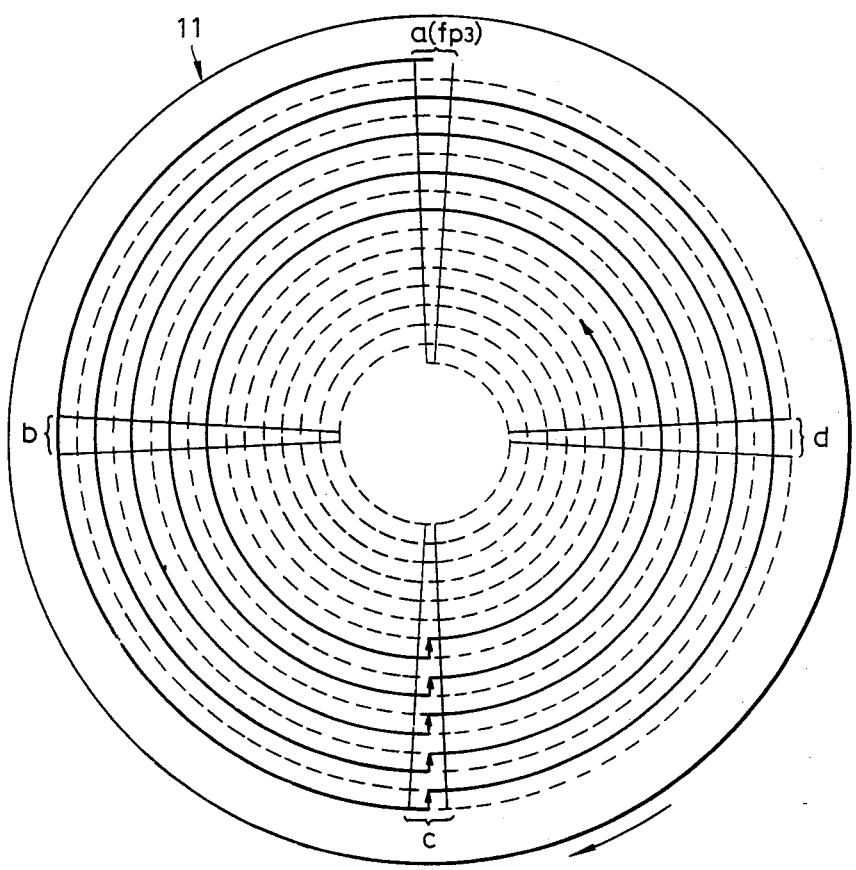
FIG. 7 shows an example of a scanning locus of a pickup reproducing element during a normal reproduction.
Figure 9:
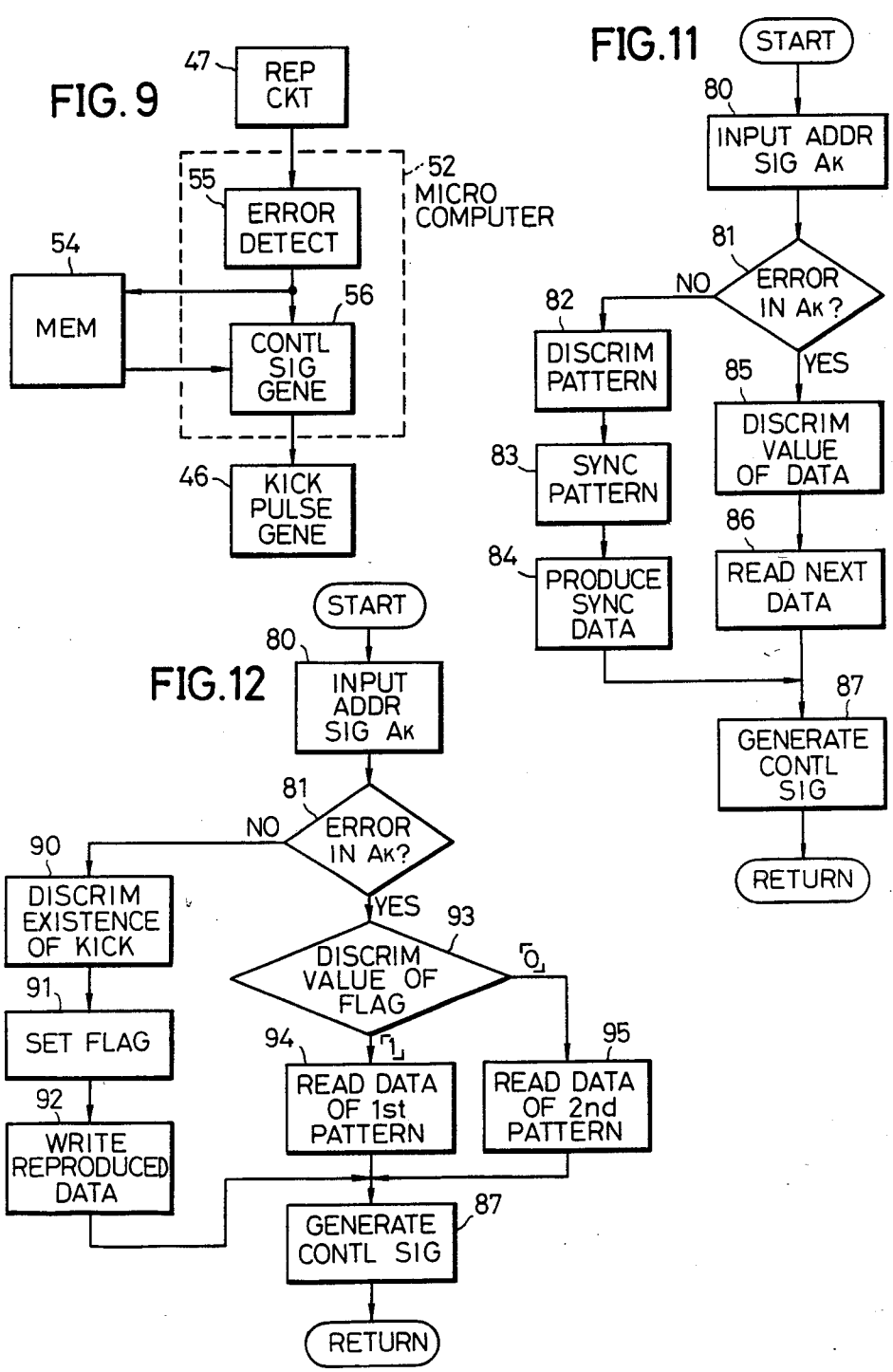
FIG. 9 is a block diagram showing an embodiment of the construction of an essential part of the block system shown in FIG. 6.

As may be seen from FIGS. 7 and 8, the scanning locus of the reproducing stylus 32 is periodical during the normal reproduction, and the scanning locus of the reproducing stylus 32 can be predicted. Thus, the microcomputer 52 is designed as shown in FIG. 9, and the operations which are in accordance with the flowcharts in FIGS. 11 and 12 are performed so as to store the periodicity of the above scanning locus. By taking these measures, the microcomputer 52 can generate and supply a control signal to the kick pulse generator 49, and cause the reproducing stylus 32 to scan over a scanning locus which has the same periodicity as the scanning locus of the reproducing stylus 32 up to that point, even when the kick address signal $A_K$ is not reproduced for some reason.

As shown in FIG. 9, the microcomputer 52 comprises an error detector means 55 for detecting an error in the reproduced kick address signal $A_K$, and a control signal generator means 56. When the reference signal fp3 or the kick address signal $A_K$ is supplied to the error detector means 55 for every one revolution period of the disc 11, it is discriminated that there is no error in the reproduced kick address signal $A_K$, and predetermined operations which will be described hereinafter are carried out. Otherwise, it is discriminated that there is an error in the reproduced kick address signal $A_K$. When there is no error in the reproduced kick address signal $A_K$, the control signal generator means 56 generates a control signal which causes the generation of a kick pulse with a polarity and timing which are in accordance with the values of the codes 28 and 29. On the other hand, when there is an error in the reproduced kick address signal $A_K$, the control signal generator 56 forms a control signal based on a value which is read out from the memory 54.

Figure 10:
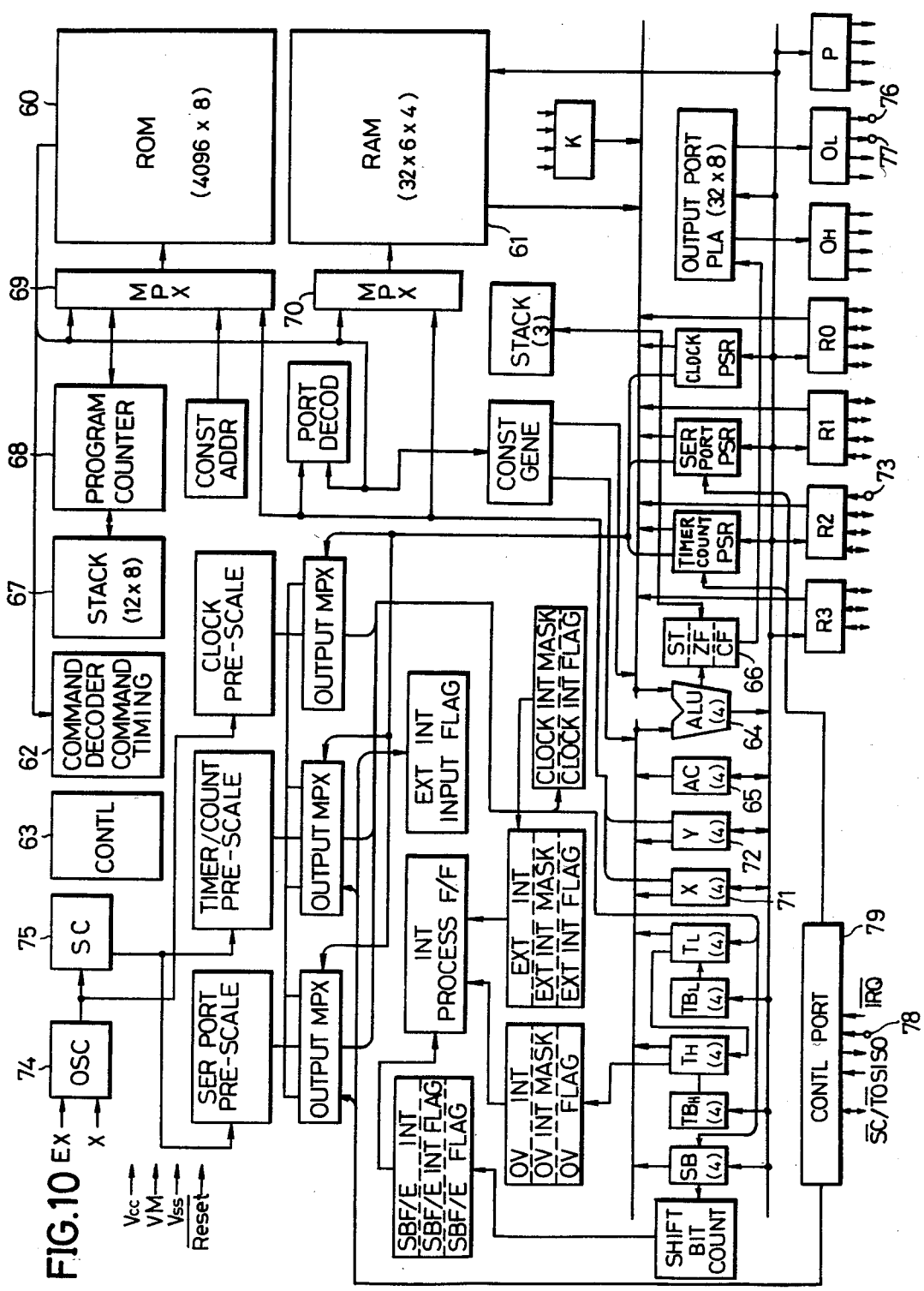
FIG. 10 is a systematic block diagram showing an embodiment of the hardware of a microcomputer in the block system shown in FIG. 6.

FIG. 10 shows an embodiment of the hardware of the microcomputer 52. In FIG. 6, the microcomputer 52 is coupled with the external memory 54, however, the memory 54 may of course be a memory which is built into the microcomputer 52. In FIG. 10, a read only memory (ROM) 60 and a random access memory (RAM) 61 correspond to the memory 54 shown in FIGS. 6 and 9. In addition, the switching pulse generator 45 and the kick pulse generator 46 may also be included within the microcomputer 52. In FIG. 10, a predetermined program is pre-loaded into the ROM 60 so that the operations which will be described in conjunction with FIGS. 11 and 12 can be performed. Furthermore, a synchronizing pattern data is pre-stored in the ROM 60. In FIG. 10, numerals in brackets indicate the bit width.

Description will first be given with respect to the general operation of the microcomputer 52. The microcomputer 52 fetches the command (instruction) from the first address in the program which is stored in the ROM 60, and decodes the command in a command decoder and command timing device 62. Various kinds of control signals are generated from a controller 63 according to the decoded command with an appropriate timing. Input and output devices, an arithmetic operation device comprising devices such as an arithmetic logic unit (ALU) 64, an accumulator 65, and a flag flip-flop 66, and a register device comprising devices such as a stack 67, a program counter 68, multiplexers (MPX) 69 and 70, an X-register 71, and a Y-register 72, which are used to execute the command, are operated by the control signals which are generated from the controller 63. The X-register 71 and the Y-register 72 designate the addresses in the RAM 61.

When the command is executed, a value "1" is added to the address in the ROM 60 wherein the first program is stored, in the program counter 68 The added content in the program counter 69 designates an address where the subsequent command is stored. Hence, the subsequent command is then fetched from the ROM 60. When this subsequent command relates to an arithmetic operation, a data which is stored in the RAM 61 and the like is supplied to the accumulator 65, and the arithmetic operation is performed by use of the ALU 64 and the accumulator 65. The result of the arithmetic operation is supplied to the RAM 61 and the like, and operations similar to those described heretofore are repeated.

Next, description will be given with respect to a case where the program which is loaded in the microcomputer 52, is a program for carrying out the operations shown in FIG. 11. In FIG. 11, the operations which are carried out in steps 81, 82, 83, and 84, are carried out in the error detector means 55 shown in FIG. 9. The operations which are carried out in steps 85, 86, and 87 are carried out in the control signal generator means 56 shown in FIG. 9. The reproduced address data $A_K$ from the kick address signal reproducing circuit 47, which is applied to a terminal 73 in an input and output port R2 shown in FIG. 10, is the input in a step 80. This reproduced address data $A_K$ is supplied to the accumulator 65. When the reproduced address data $A_K$ is supplied to the accumulator 65 in synchronism with a clock pulse which is formed by an oscillator 74 and a frequency divider (state counter) 75 shown in FIG. 10, and the 4-bit address data of the codes 28 and 29 are applied as input to the accumulator 65, this 4-bit address data is stored in the RAM 61.

On the other hand, the reproduced reference signal fp3 is supplied to a control port 79 through an input terminal 78, and is further applied to the RAM 61. The RAM 61 counts an interrupt signal e,ovs/IRQ/ which has a predetermined period, within each period of the reproduced reference signal fp3. Hence, discrimination is made within the RAM 61 to determine whether there is an incoming address data for every one revolution period of the disc 11. When there is an incoming address data with one revolution period of the disc 11, it is discriminated that there is no error in the address data. On the other hand, when there is no incoming address data with one revolution period of the disc 11, it is discriminated that there is an error in the address data. These discriminations correspond to the step 82. When it is discriminated that there is no error in the address data, the data in the codes 28 and 29 which are applied to the RAM 61 are decoded, and the kick pattern (scanning locus pattern) which is indicated by the decoded data is discriminated (step 82). Thereafter, synchronization of the reproduced address data is ensured by discriminating the position of the reproduced address data in one period of the kick pattern which is pre-stored in the ROM 60 (step 83). Further, the kick pattern synchronizing data of the ROM 60 is transferred to the RAM 61 (step 84). A control signal is generated based on the synchronizing data which is read out from the RAM 61 (step 87), and this control signal is supplied to the kick pulse generator 46.

The microcomputer 52 may be designed to self-generate the kick pulse. In this case, a high-level pulse and a low-level pulse are successively produced through terminals 76 and 77 in an output port $O_L$ so that one pulse is always high when the other pulse is low, and these high and low-level pulses are used as the kick pulse.

On the other hand, when it is detected in the step 81 that the kick address signal $A_K$ was not reproduced due to signal dropout and the like, the value of a pattern synchronizing data which is obtained from the kick address signal $A_K$ which was reproduced previously, is discriminated (step 85). A data which should be used as the subsequent data, is read out from a pattern table which is pre-stored in the ROM 60 (step 86). Then, a control signal is generated based on the data which is read out from the pattern table (step 87), and this control signal is supplied to the kick pulse generator 46.

Accordingly, when playing a disc which must be scanned along the scanning locus shown in FIG. 7 at the time of the normal reproduction, the reproducing stylus 32 is forcibly kicked within the section c by one track pitch towards the inner periphery of the disc, for every second track. On the other hand, when playing a disc which must be scanned along the scanning locus shown in FIG. 8 at the time of the normal reproduction, the kick address signal $A_K$ which is not reproduced is substituted by the kick address signal which was reproduced five revolutions before, by assuming that the contents of the kick address signal $A_K$ which is not reproduced are the same as the contents of the kick address signal which was reproduced five revolutions before. Thus, in this case, the reproducing stylus 32 is forcibly kicked to scan along the scanning locus shown in FIG. 8 which has a periodicity of five revolutions of the disc.

Next, description will be given with respect to a second embodiment of the operation of the microcomputer 52, by referring to FIG. 12. In FIG. 12, those steps which are the same as those corresponding steps shown in FIG. 11 are designated by the same reference numerals, and their description will be omitted In the scanning loci shown in FIGS. 7 and 8, the scanning pattern is such that one or more frames (two or more fields) are continuously reproduced without a kick. When there is no kick back (no kick towards the outer periphery of the disc) within the section a in one previous revolution of the disc, the picture of one field prior to the section a and the picture of one field subsequent to the section a, relate to different pictures (pictures of different fields). Hence, in this case, there should be no kick within the subsequent section b. In the present embodiment, the above scanning pattern is noted. In other words, the operations which are carried out in steps 81, 90, 91, and 92 shown in FIG. 12, correspond to the operations which are carried out in the error detector means 55 shown in FIG. 9. Further, the operations which are carried out in steps 93, 94, 95, and 87 correspond to the operations which are carried out in the control signal generator means 56.

When there is no error in the reproduced address signal $A_K$, the step 90 discriminates whether there should be a kick back, every time the section a is reproduced (that is, for every one revolution period of the disc). This discrimination on the existence of a kick back, is made based on the values of each LSB in the codes 28 and 29. When there should be a kick back, a flag is set to "1", and this flag is set to "0" when there should be no kick back (step 91). After this flag is stored in the RAM 61, the data is written into the RAM 61 from the accumulator 65 based on the values of the codes 28 and 29 in the reproduced address signal $A_K$ (step 92). A control signal is generated based on the data which is written into the RAM 61 (step 87).

On the other hand, when the kick address signal $A_K$ is not reproduced from one track due to signal dropout and the like, the microcomputer 52 discriminates whether there should be a kick back within the section a in the same one track, that is, at a position immediately prior to the position where the address signal $A_K$ is reproduced. This discrimination is made in the step 93 by reading out the stored flag from the RAM 61, supplying the value of the read-out flag to the ALU 64 through the accumulator 65, and then carrying out the discrimination based on the operation result in the ALU 64. When the value of the read-out flag is "1", the operation of the microcomputer 52 advances to the step 94. In this step 94, a first pattern data (an 8-bit data corresponding to the codes 28 and 29 and assuming a value "88" in hexadecimal number) which was pre-stored at a predetermined address in the ROM 60, is read out from the ROM 60, and a control signal is generated according to the read-out first pattern data. On the other hand, when the value of the read-out flag which is discriminated in the step 93 is "0", there should be no kick back within the section a in the same one track. Thus, in this case, the operation of the microcomputer 52 advances to the step 95 to read out a second pattern data (an 8-bit data corresponding to the codes 28 and 29 and assuming a value "44" in hexadecimal number) which was pre-stored at another predetermined address in the ROM 60, and a control signal is generated based on this read-out second pattern data.

According to the present embodiment, when the kick address signal $A_K$ is not reproduced due to signal dropout and the like, the reproducing stylus 32 is controlled and kicked within the subsequent section b towards the inner periphery of the disc when there is a kick back immediately prior to the position where the address signal $A_K$ should have been reproduced. The reproducing stylus 32 is controlled and kicked within the section c towards the inner periphery of the disc when there is no kick back immediately prior to the position where the address signal $A_K$ should have been reproduced. As a result, the reproducing stylus 32 moves along the scanning locus shown in FIG. 7. In addition, in the case where the disc is to be scanned along the scanning locus shown in FIG. 8, the reproduction can be carried out by avoiding discontinuous points of the audio signal, as will be described later on in the specification. Moreover, according to the present embodiment, the memory capacity of the ROM 60 may be smaller than the memory capacity required in the first embodiment. For this reason, the construction of the microcomputer 52 may be simplified, and the computer program may also be simplified.

Figure 13:
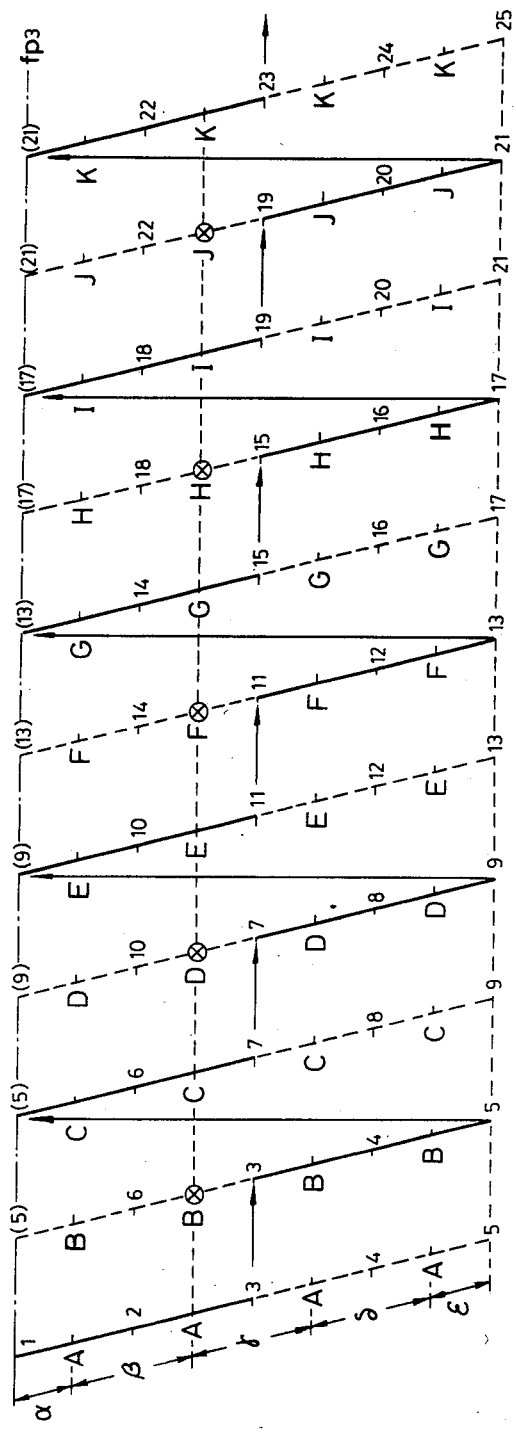
FIG. 13 shows the reproducing sequence of pictures of a movie film and the reproducing sequence of divided audio signal parts when carrying out a normal reproduction according to the scanning locus shown in FIG. 7.

In the case of the disc which should be scanned along the scanning locus shown in FIG. 7 at the time of the normal reproduction, the recorded signals are reproduced in the sequence shown in FIG. 13. Further, in the case of the disc which should be scanned along the scanning locus shown in FIG. 8 at the time of the normal reproduction, the recorded signals are reproduced in the sequence shown in FIG. 14. In FIGS. 13 and 14, the alphabets indicate color video signals related to one picture of the movie film, the numerals indicate the divided sequence of the divided audio signal parts which are obtained by dividing the audio signal which is to be recorded for every one or ½ field, and the locations where the numerals are illustrated indicate ranges in which the divided audio signal parts are recorded. Hence, the audio signal is normally reproduced when the tracks are reproduced according to the sequence of the numerals. In addition, reference characters $\alpha$ and $\epsilon$ in FIG. 13 indicate a duration of ½ field, and reference characters $\beta$, $\gamma$, and $\zeta$ indicate a duration of one field.

In FIGS. 13 and 14, each of the oblique lines sloping to the right of the figure, indicate one track turn. The recorded position of the color video signal related to one picture of the movie film, is indicated on the left of the oblique line, and the numeral illustrated on the right of the oblique line indicates the recorded position of the divided audio signal part. Further, among the oblique lines, portions indicated by solid lines represent track parts which are scanned and reproduced. As clearly seen from FIG. 13, the reproducing stylus 32 scans in a sequence A→A→B→B→C→C→ . . . in terms of a duration of one field, so as to reproduce the pictures of the movie film. As a result, the color video signal related to the same picture of the movie film, is repeatedly reproduced in terms of a duration of two fields, and a normal reproduction picture is obtained which is in accordance with the known 2-2 pull-down system.

On the other hand, with respect to the audio signal, the divided audio signal parts are successively reproduced in the divided sequence as may be seen from FIG. 13, and the recorded audio signal is normally reproduced. Moreover, the kick occurs within the section c in this case, and the kick will occur at positions avoiding the discontinuous points of the audio signal. The discontinuous points of the audio signal are indicated by a symbol " " FIG. 13. Consequently, even when the kicking position changes for some reason, there will be no discontinuities in the reproduced audio signal, and the audio signal can always be reproduced normally.

On the other hand, arrows pointing to the left of the figure in FIG. 14, indicate a kick to the section a in the same one track. As clearly seen from FIGS. 14 and 8, the reproducing stylus 32 scans in a sequence A→A→B→B→B→C→D→D→D→E→E→F→F→ . . . in terms of a duration of one field, so as to reproduce the pictures of the movie film. In this case, the color video signal related to the same picture of the movie film is repeatedly reproduced for a duration of two fields, and the color video signal related to the same subsequent picture of the movie film is repeatedly reproduced for a duration of three fields. As a result, a normal reproduction picture is obtained which is in accordance with the known 2-2 pull-down system, and this normal reproduction picture includes no time base fluctuation.

With respect to the audio signal, the divided audio signal parts are successively reproduced in the divided sequence as may be seen from FIG. 14, and the recorded audio signal is normally reproduced. Moreover, the kick occurs within the section c in this case, and the kick will occur at positions avoiding the discontinuous points of the audio signal. The discontinuous points of the audio signal are indicated by a symbol " " in FIG. 14. Consequently, even when the kicking position changes for some reason, there will be no discontinuities in the reproduced audio signal, and the audio signal can always be reproduced normally.

There are cases where the kick address signal $A_K$ cannot be reproduced due to signal dropout and the like. For example, when the address signal $A_K$ which is recorded on the second track from the left in FIG. 14 cannot be reproduced, the reproducing stylus 32 is kicked within the section b towards the inner periphery of the disc when it is detected that there was a kick back immediately prior to the position where the address signal $A_K$ should have been reproduced, according to the second embodiment.

Thus, the reproduction is carried out avoiding the discontinuous points of the audio signal which are indicated by the symbol " " in FIG. 14. The reproduction is carried out similarly by avoiding the discontinuous points of the audio signal, according to the first embodiment.

The video signal of the same picture (same field) can be repeatedly reproduced, by repeatedly kicking the reproducing stylus 32 by one track pitch in the reverse direction only within the section a on the disc 11. Hence, it is possible to obtain a completely still reproduced picture in which no fluctuating movements exist.

The present invention may also be applied to an optical type reproducing apparatus which reproduces the recorded signals from the disc by use of a laser beam. In addition, the present invention may be applied to a reproducing apparatus which reproduces the recorded signals from a disc which is recorded with the kick address signal $A_K$ in one or more sections among the sections b, c, and d which are recorded with the vertical blanking periods.

Further, the present invention is not limited to these embodiments, but various variations and modifications may be made without departing from the scope of the present invention.

What is claimed is:

1. A reproducing apparatus for reproducing recorded signals from tracks on a rotary recording medium, said rotary recording medium being repeatedly recorded with a video signal of the same unit for a duration which amounts to a plurality of fields in each track turn, and with a track shift address signal in at least one location in each track turn, said track shift address signal being recorded with a predetermined period and instructing the existence of a forced track shift of a pickup reproducing element and instructing the position and the direction of the track shift, said pickup reproducing element reproducing the recorded signals from said rotary recording medium by moving along a scanning locus which is based on the instructions contained in said track shift address signal, said reproducing apparatus comprising:

reproducing means including said pickup reproducing element, for reproducing the recorded signals from said rotary recording medium;

an address signal reproducing circuit for reproducing said track shift address signal from the signals which are reproduced by said reproducing means;

detecting means for detecting whether the reproduced track shift address signal is produced from said address signal reproducing circuit with the predetermined period;

memory means for storing the value of the reproduced track shift address signal or a flag which is related to the value of the reproduced track shift address signal, when said detecting means detects that said track shift address signal is reproduced with the predetermined period; and control signal generating means for generating a control signal which causes said pickup reproducing element to undergo a forced track shift at predetermined positions on the tracks so that said pickup reproducing element scans along a scanning locus which has the same periodicity as the scanning locus along which said pickup reproducing element had been scanning up to that point, said control signal being generated based on the value of the reproduced track shift address signal when said detecting means detects that said track shift address signal is reproduced with the predetermined period, and based on one or a plurality of values which are pre-stored in said memory means when said detecting means detects that said track shift address signal is not reproduced with the predetermined period.

2. A reproducing apparatus as claimed in claim 1 in which said memory means pre-stores a pattern table which contains values of said track shift address signal for at least one period of the scanning locus of said pickup reproducing element, and said control signal generating means reads out the value of a subsequent track shift address signal which is predicted from said pattern table which is pre-stored in said memory means when said track shift address signal cannot be reproduced, and generates the control signal based on the value which is read out from said pattern table.

3. A reproducing apparatus as claimed in claim 1 in which said memory means comprises first memory means for renewing and storing a flag which indicates whether said pickup reproducing element is to be forcibly shifted in a reverse direction, every time said track shift address signal is reproduced, and second memory means pre-stores two kinds of data which are in accordance with the existence of a forced track shift of said pickup reproducing element in the reverse direction, and said control signal generating means generates the control signal by discriminating the value of the flag which is read out from said first memory means and by reading out one of the two kinds of data from said second memory means according to the discriminated value of the flag when said track shift address signal is not reproduced.

4. A reproducing apparatus as claimed in claim 1 in which at least said detecting means and said control signal generating means are constituted by a microcomputer.

* * * * *